| United States Patent [19] | [11] Patent Number: 5,064,472 |
| Drake et al. | [45] Date of Patent: Nov. 12, 1991 |

[54] COMPOSITION

[75] Inventors: John A. G. Drake, Killiney; Ian L. Jamieson, Glen of the Downs, both of Ireland

[73] Assignee: Foster Wheeler USA Corporation, Clinton, N.J.

[21] Appl. No.: 394,306

[22] Filed: Aug. 14, 1989

Related U.S. Application Data

[63] Continuation of Ser. No. 042,912, Apr. 27, 1987, abandoned.

[30] Foreign Application Priority Data

Apr. 30, 1986 [IE] Ireland .................................. 2667/85

[51] Int. Cl.$^5$ ............................................. C08L 95/00
[52] U.S. Cl. .................................. 106/278; 106/273.1; 106/284
[58] Field of Search .................. 106/273.1, 278, 284

[56] References Cited

U.S. PATENT DOCUMENTS 2,761,823  9/1956  Ayers et al. ............................ 208/21
2,779,745  1/1957  Howland .............................. 523/205
3,607,513  9/1971  Samson ................................. 156/181

FOREIGN PATENT DOCUMENTS

J82023711  5/1982  Japan .

OTHER PUBLICATIONS

Derwent Abstracts, Accession No. 85-14156/24, German Patent No. DD-218771-A, Rambach et al., 2/13/85.
Derwent Abstract, Accession No. 84-183075/30, German Patent DD-208164-A, Spur et al., 3/28/84.
Derwent Abstract, Accession No. 78-13188A/07, Japanese Patent J82023711-B, 5/20/82.

Primary Examiner—William R. Dixon, Jr.
Assistant Examiner—Alan A. Wright
Attorney, Agent, or Firm—Marvin A. Naigur

[57] ABSTRACT

A composition which comprises a solvent extract of peat or a pyrolysis product of peat or a montan wax and petroleum bitumen of the paving grade type.

10 Claims, 9 Drawing Sheets

COMPOSITION

This application is a continuation-in-part, continuation of application Ser. No. 07/042,912, filed Apr. 27, 1987 abandoned.

This invention relates to a new composition of matter. In particular, it relates to a composition for use in the preparation of bituminous road binders.

According to official records nearly 100,000 tonnes of petroleum bitumen costing about IR£20m are imported into Ireland every year. This material is mainly used as road binders in the construction and maintenance of road surfacings. Because of the high cost of bitumen and its strategic importance, a great deal of attention has been devoted to finding local substitutes. Although a number of alternatives such as coal tar, shales, natural asphalts, and sulphur have been developed (1),(2), these are not available in Ireland.

It is an object of the present invention to overcome these problems.

The invention therefore provides a composition which comprises a solvent extract of peat or a pyrolysis product of peat or a montan wax and petroleum bitumen of the paving grade type.

Preferably, the proportion of the solvent extract or the pyrolysis product of peat or the montan wax to petroleum bitumen is up to 50% by weight. Most preferably, the proportion is in the range 15%-30% by weight.

Preferably, the penetration value of the petroleum bitumen ranges from 35 pen. to 450 pen.

Preferably, the penetration value of the composition ranges from 35 pen. to 450 pen. Most preferably, the penetration value of the composition ranges from 50 pen. to 200 pen.

Preferably, the solvent extract of peat is characterised by the following typical properties viz:
Saponification value: 71-231 mgKOH/g
Acid value: 15-105 mgKOH/g
Ester value: 32-139 mgKOH/g
Iodine value: 14-46 cg/g
Melting point (drop point):, 67°-86° C.;

Preferably, the montan wax is characterised by the following typical properties viz:
Saponification value: 40-100 mgKOH/g
Acid value: 23-40 mgKOH/g
Ester value: 20-60 mgKOH/g
Iodine value: 14-46 cg/g
Melting point (drop point): 75°-90° C.;

The petroleum bitumen is characterised by penetration value or viscosity according to standard specifications for this material.

The characteristics of the solvent extract of peat or the pyrolysis product of peat or the montan wax may be obtained using conventional standard techniques such as the American Standard Test Methods (ASTM) or Institute of Petroleum (IP) Test Methods or Standardisation of Tar Products Test Committee (STPTC).

Figure 3:
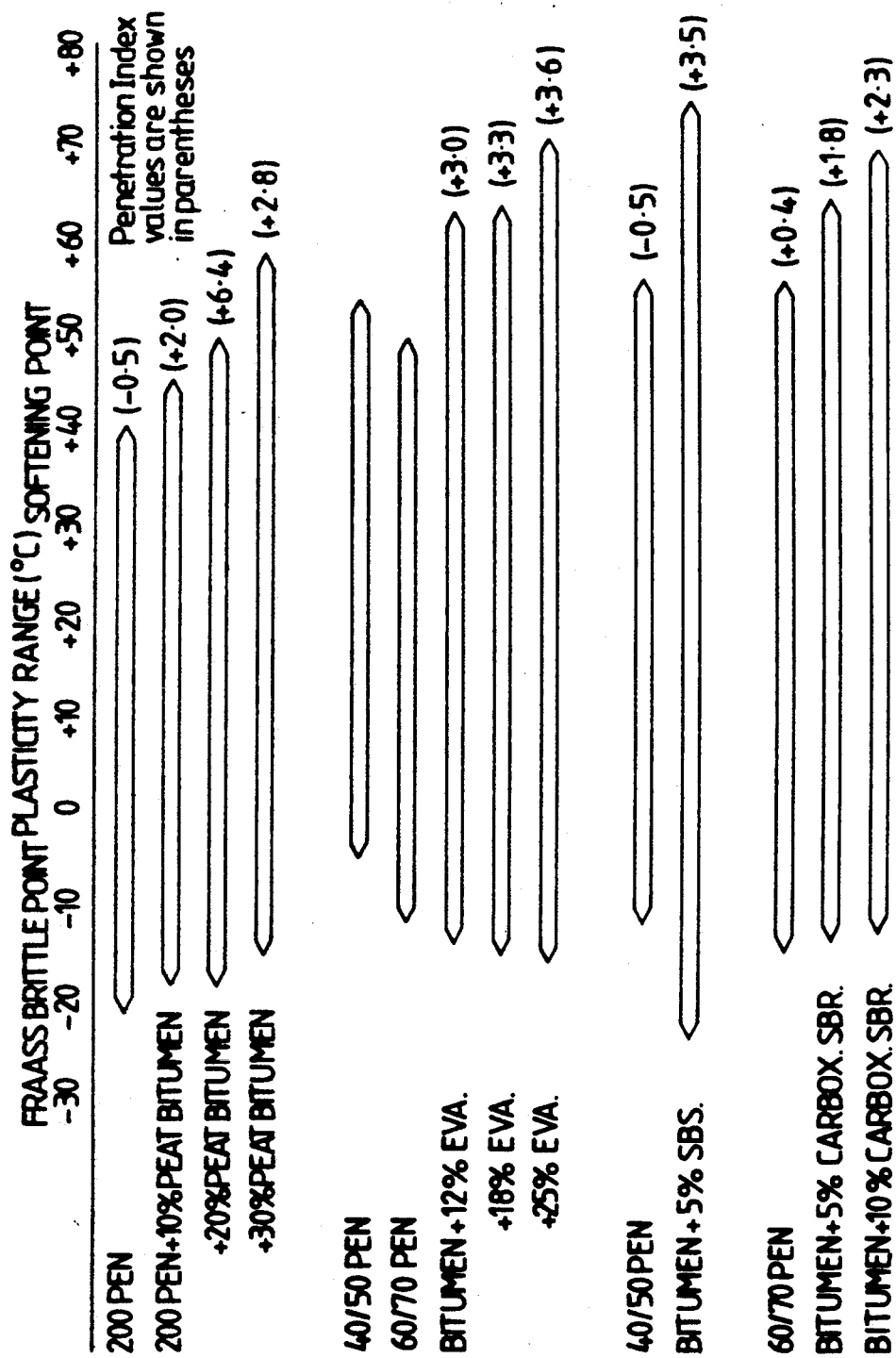
Figure 4:
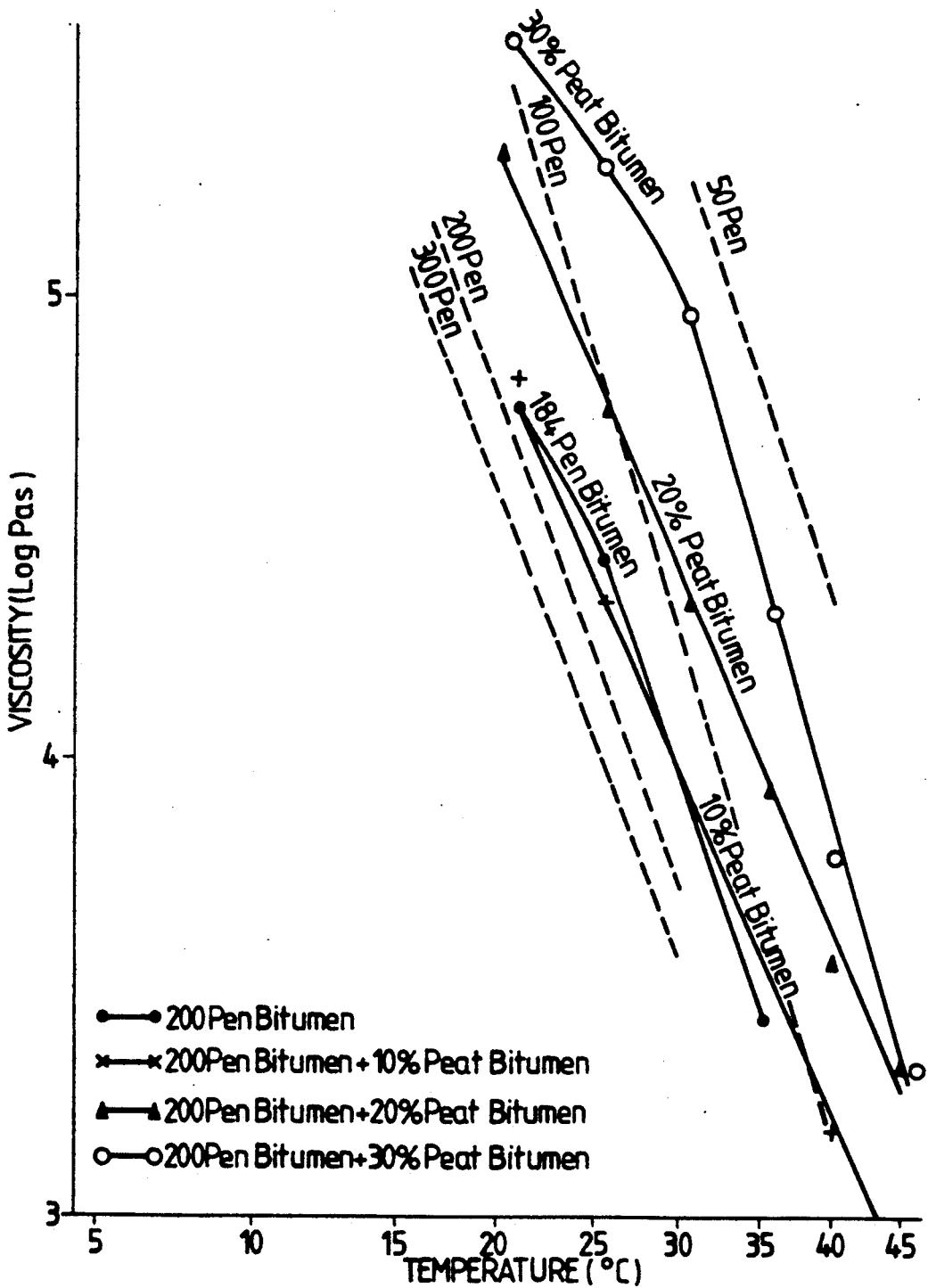
Figure 5:
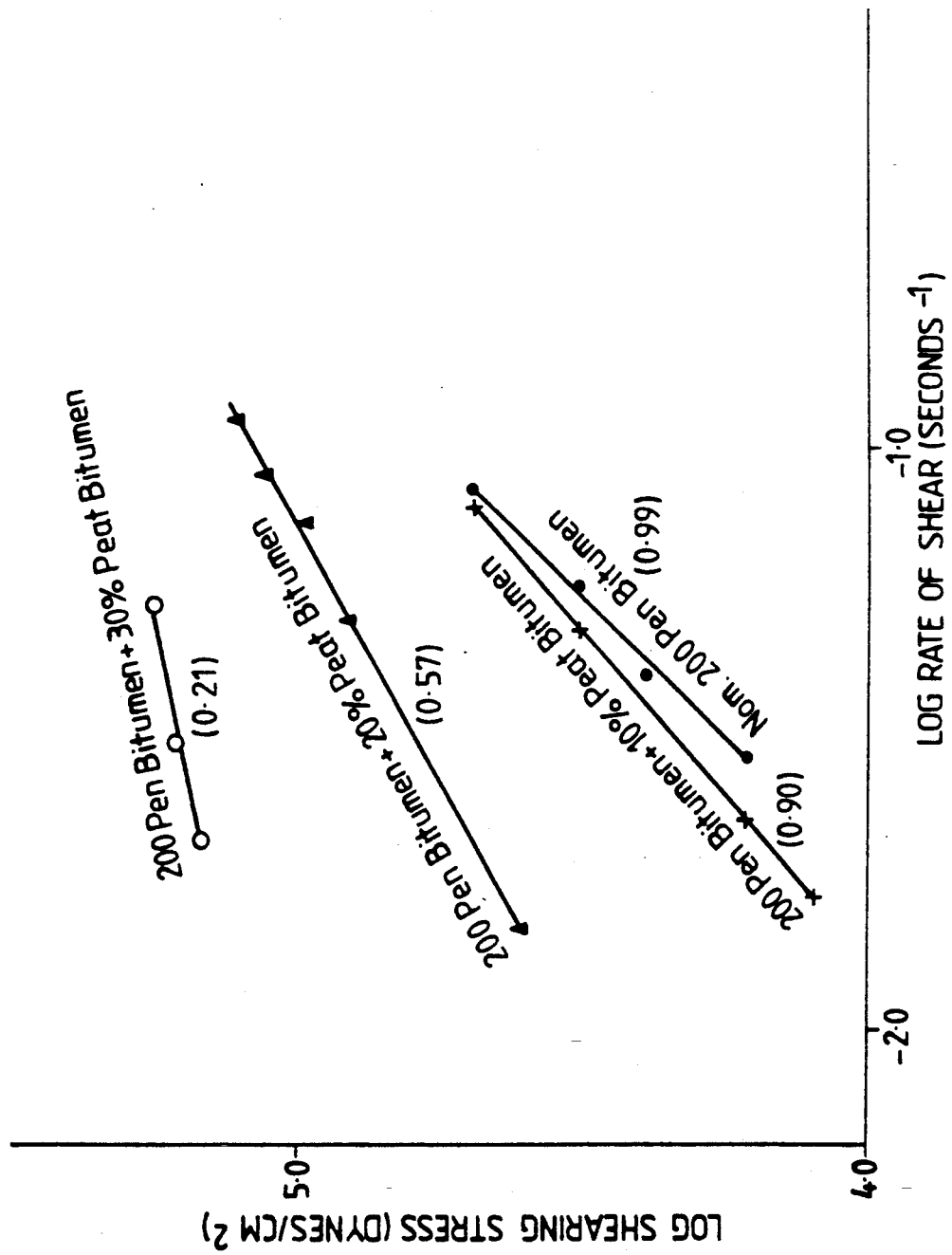
Figure 6:
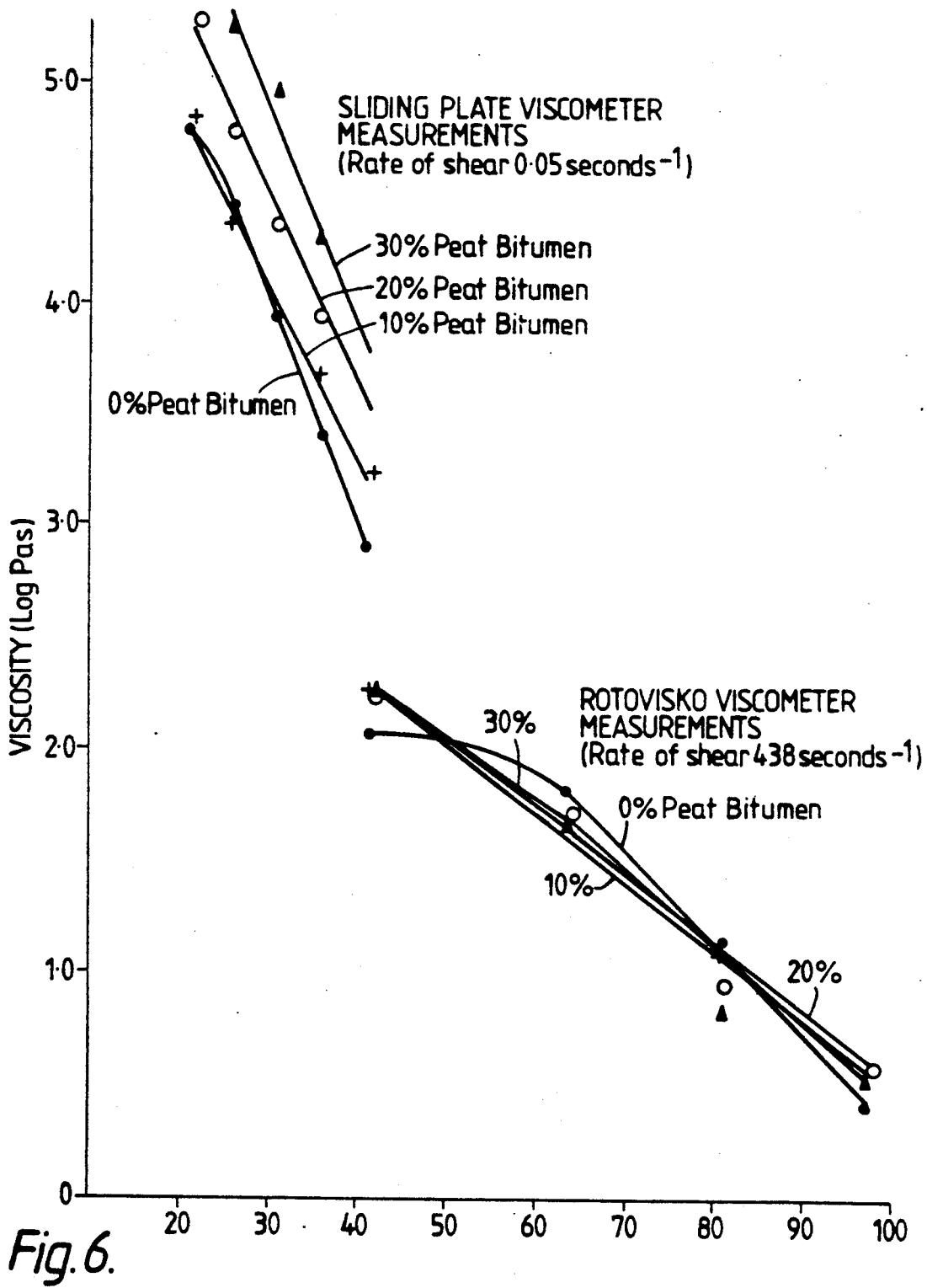
Figure 7:
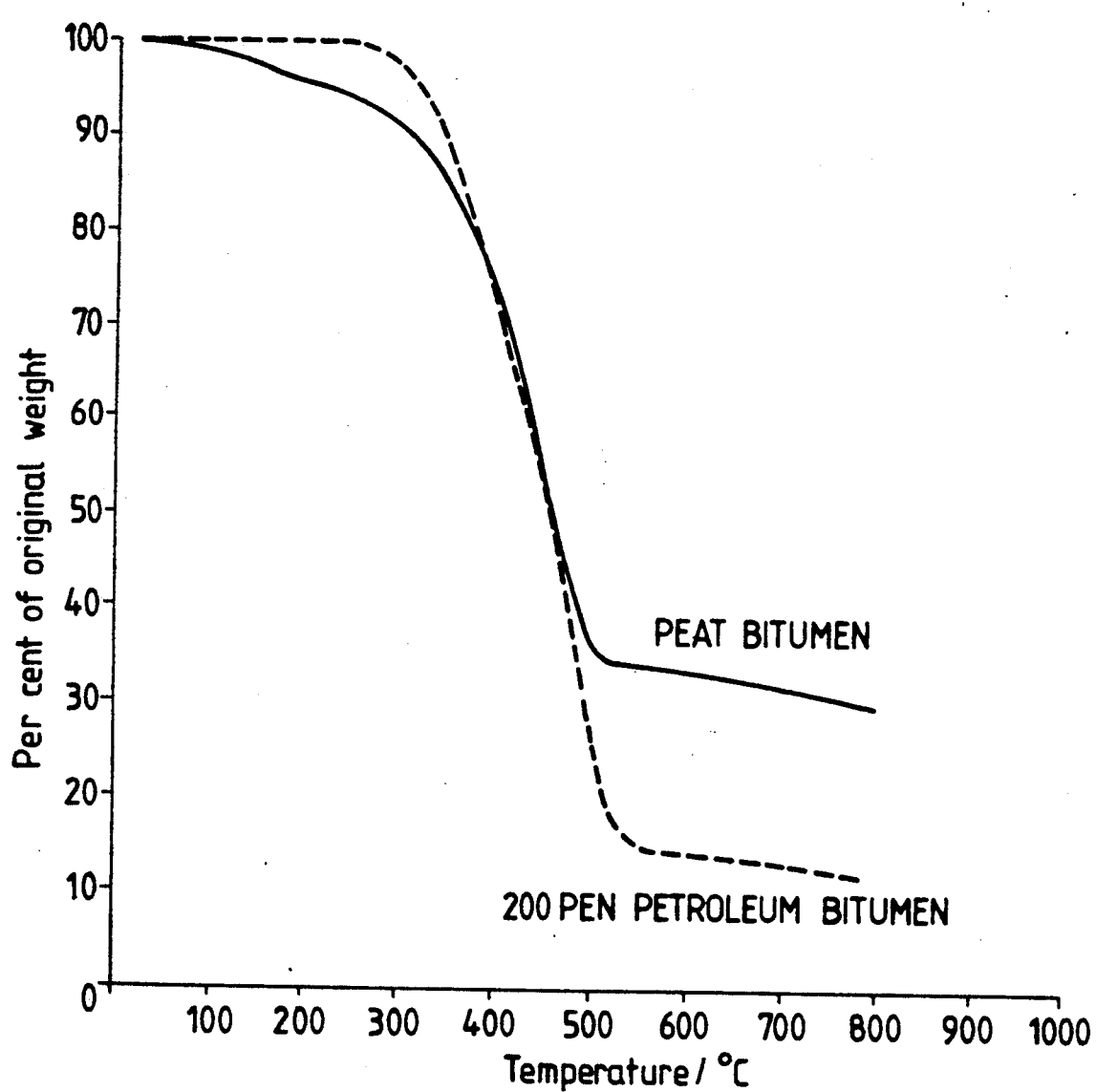
Figure 8:
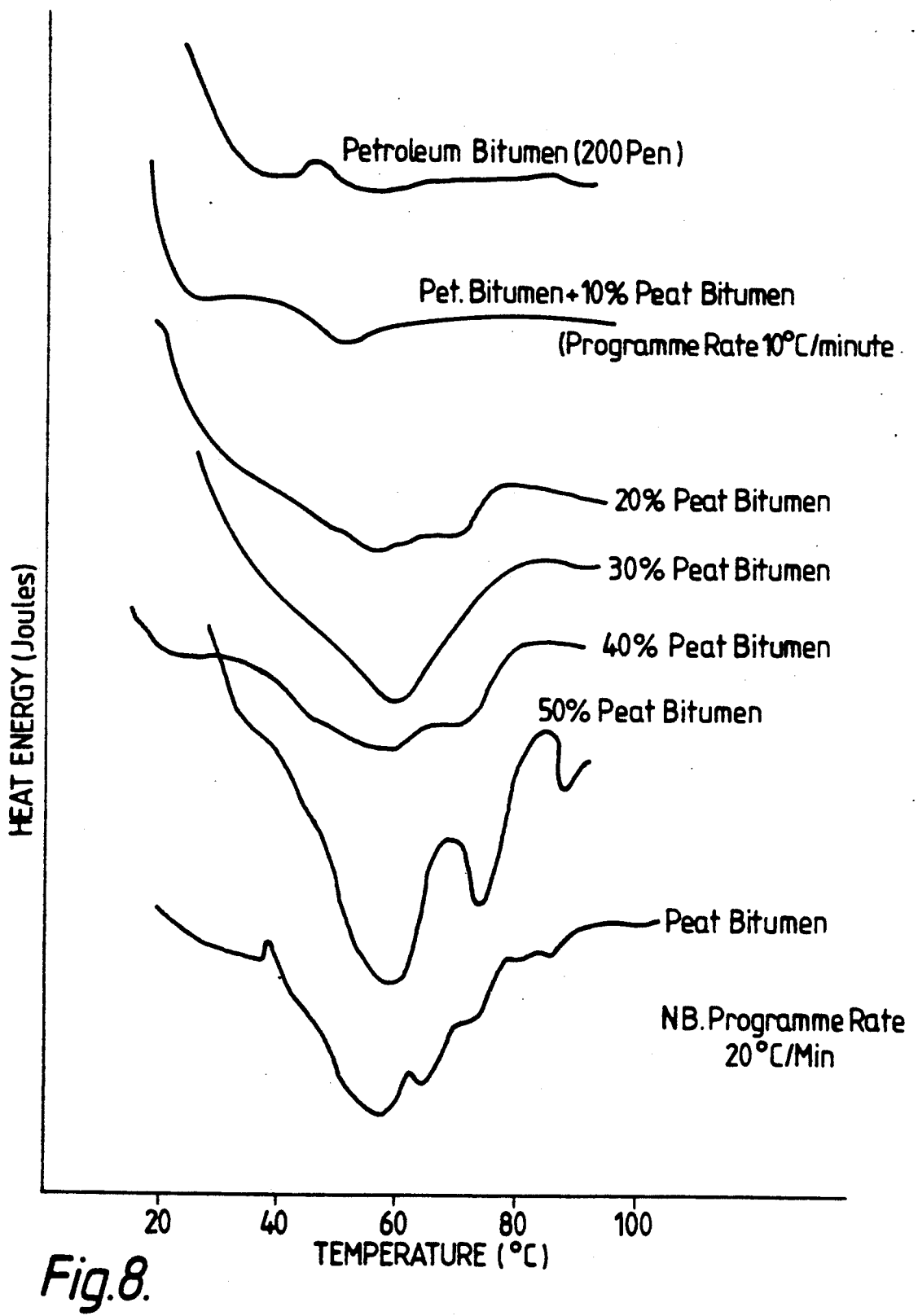
Figure 9:
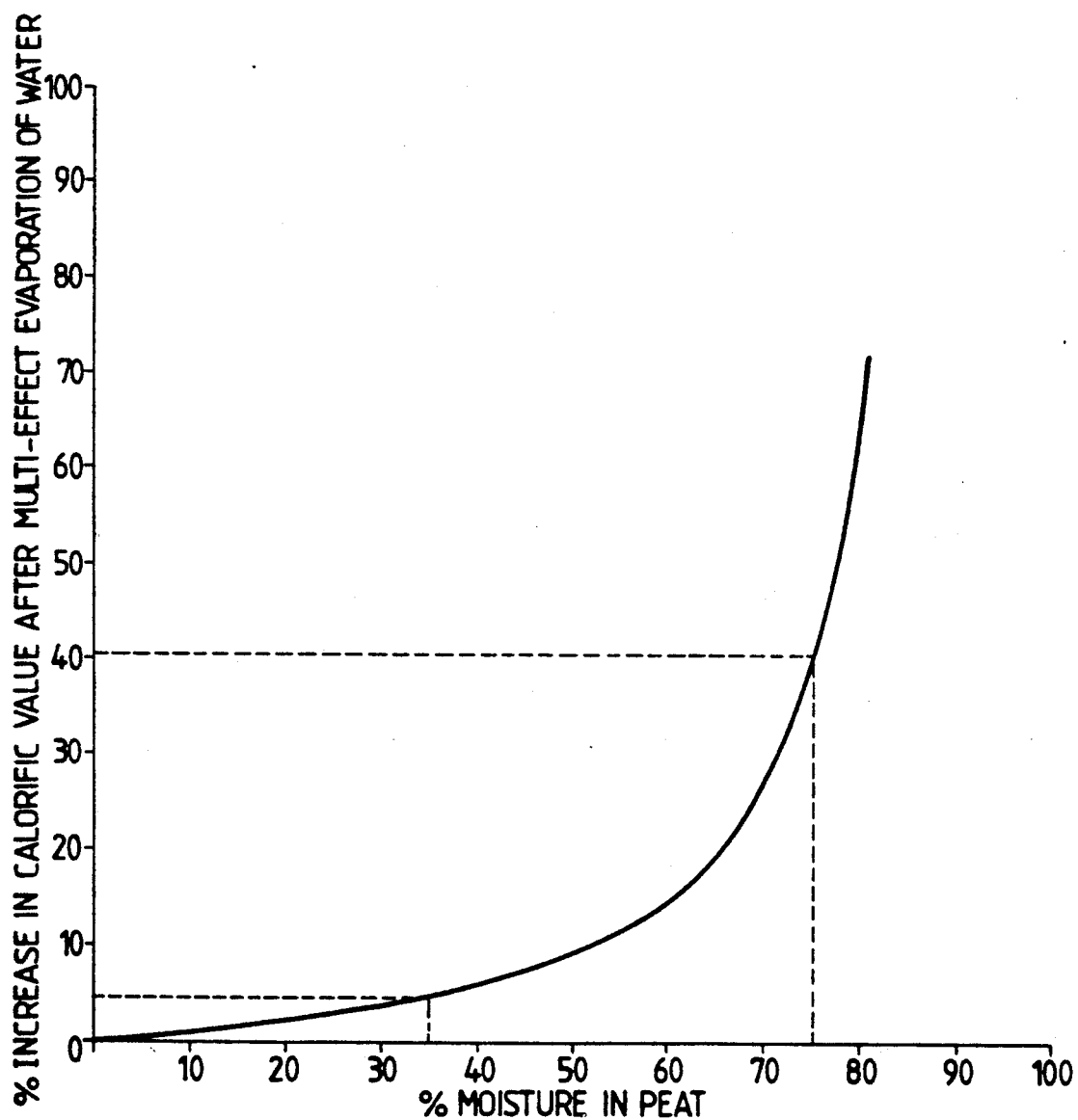

FIG. 3 gives plasticity range values for bitumens containing peat-bitumen and other polymer additives, wherein EVA=ethylene vinyl acetate copolymer and SBS=styrene butadiene styrene copolymer and CARBOX SBS=carboxylated styrene butadiene rubber;

FIG. 4 shows viscosity temperature plots given by 184 pen petroleum bitumen with varying amounts of peat bitumen, the plots being superimposed on typical plots for bitumens of various penetration grades;

FIG. 5 are rheograms for bitumens containing various amounts of peat bitumen;

FIG. 6 shows viscosities of peat bitumen/petroleum bitumen blends as determined by sliding plate viscometer (0.05 seconds $^{-1}$) and Rotovisko viscometer (438 seconds $^{-1}$);

FIG. 7 shows thermograms of peat petroleum bitumens;

FIG. 8 shows thermograms of blends of peat bitumen and petroleum bitumen using differential scanning calorimetry; and FIG. 9 shows the change in calorific value of peat dried by the multi-effect process where part of the peat is used as a heat source in the evaporation of moisture and assuming 0.75 efficiency in raising steam and ⅔ reduction in heat required to evaporate the water.

The solvent extract of peat may be obtained using petroleum distillates; chlorinated petroleum distillates; $C_1$-$C_{18}$ alcohols; chlorinated $C_{1-18}$; $C_3$-$C_{18}$ ketones; chlorinated $C_3$-$C_{18}$ ketones; $C_6$-$C_{10}$ aromatic solvents; chlorinated $C_6$-$C_{18}$ aromatic solvents; or derivatives thereof.

Blending of the solvent extract of peat or the pyrolysis product of peat or the montan wax with the petroleum bitumen may be achieved by heating to render them sufficiently fluid to achieve homogeneous mixing.

Petroleum bitumens (the residue from petroleum oil distillation) are mainly composed of relatively unreactive hydrocarbons; the higher paraffins (from eicosane ($C_{20}$) upwards), naphthenes (polyalkylated cyclic paraffins), a small proportion of aromatic hydrocarbons and polar compounds (those containing elements other than hydrogen and carbon). Ideally, partial substituents or petroleum bitumen extenders should have similar chemical characteristics; they should not cause agglomeration of the heavier components (asphaltenes) or separation of the lighter oils. In particular, they should not be detrimental to the rheological behaviour of the petroleum bitumen or to its ability to adhere to aggregate particles or reduce its durability in service.

Peat is comprised of organic fibrous material in various stages of decomposition dispersed in water while the solvent extract of peat may be defined as material which can be extracted from peat by organic liquids.

The pyrolysis product of peat may be defined as material obtained from the thermal decomposition of peat (21). Montan wax may be defined as a solvent extract of brown coal/lignite. The solvent extract of peat, the pyrolysis product of peat and the montan wax will, hereinafter, be collectively referred to as peat bitumen.

It is the compatibility of peat bitumen with petroleum bitumen which determines whether they can be used as petroleum bitumen extenders. Peat bitumen consists, essentially, of three types of constituents (3),(4) hydrocarbons, acids and alcohols ($C_{20}$ to $C_{30}$) with amounts of aromatic and alcyclic compounds of both polar and non-polar nature. The acid and alcohol components in peat bitumen may be combined (3) to varying extents, as esters. Thus the chemcial nature of peat bitumen is different to a degree from that of petroleum bitumen.

Proportions of polar to non-polar aliphatic compounds present in peat bitumen could influence the compatibility of the peat and petroleum material. In general, the higher the aliphatic content of peat bitumen the more compatible it will be with the petroleum bitumen.

On the other hand the polar groups in the peat are an important factor as they enhance the emulsification of peat bitumen/petroleum bitumen blends and the stability properties prior to and during application.

The aliphatic ester fraction (about 40% of the peat bitumen) can be removed from peat bitumen by further extraction with a petroleum solvent, to leave a residue containing a large proportion of resinous polar materials.

Peat samples whose moisture content is lower than 12% or significantly higher than 45% are known to yield markedly less solvent extractable bitumen (5) and ovendried peat shows clear evidence of a change in the character of the peat bitumen as evidenced by an increase in the molecular weight (6).

Among other important factors which influence the yield of the solvent extract of peat (hereinafter referred to as peat extract) are:

(a) The choice of solvent.
Generally higher yields of peat extracts have been achieved with the use of moderately polar solvents (Table 1) and the proportions of aliphatic esters, resins and asphalts in peat bitumen is related to solvent polarity (Table 2) (4). A benzene/ ethanol azeotropic solvent gives a higher yield of peat extract than does petroleum ether and the extracts have a higher asphalt content. Indeed most mixed solvents give higher peat extract yields with shorter extraction times, (7) than those obtainable from the individual solvents.

(b) Extraction temperature.
Normally one would expect both a higher extraction rate and yield of peat extract with an increase in temperature.

(c) The physical state of the peat.
Strictly speaking the granular size of peat particles influences the rate of extraction rather than yield. However, one should consider the benefit of time saving with respect to yield. It has been suggested (8) that 3 to 5 mm is the optimum peat particle size and that it is important for the density not to exceed 0.8 g cm$^{-3}$ or extraction rates will decrease.

As peat is rarely dry when harvested, recycling solvent extraction systems will pick up water; in most cases yields of bitumen are then reduced slightly by this presence of water (7). However, constant boiling binary or tertiary azeotropes which contain water are advantageous for recycling solvent extraction systems since there are constant rates of heat transfer in stills and condensers and the solvent composition in contact with the peat remains constant with each cycle (provided that the water in excess of the azeotropic concentration is removed prior to the re-use of the azeotrope).

TABLE 1

Variations in the melting point (drop point) and yield of peat extract obtained from different solvents at their boiling point in a Soxhlet apparatus.

| SOLVENT | Boiling point of the solvent (°C.) | % Yield of bitumen on dry peat | Drop point (°C.) |
| --- | --- | --- | --- |
| Benzene/ethanol azeotrope | 67.8 | 9.91 | 77 |

TABLE 1-continued

Variations in the melting point (drop point) and yield of peat extract obtained from different solvents at their boiling point in a Soxhlet apparatus.

| SOLVENT | Boiling point of the solvent (°C.) | % Yield of bitumen on dry peat | Drop point (°C.) |
| --- | --- | --- | --- |
| Butan-2-ol | 99.5 | 9.81 | 75 |
| n-Hexane | 68.7 | 3.0 | 64 |
| Petroleum ether (60–80)* | 60–80 | 3.09 | 67 |

For comparison the drop point of 200 pen. petroleum bitumen is 68° C. and that of 100 pen. petroleum bitumen is 70° C.
*Petroleum ether (40–60) or petroleum ether (80–100) may also be used.

TABLE 2

The aliphatic ester, resin and asphalt* content of peat extract extracted with various solvents$^{(4)}$.

| SOLVENT | mean % Composition of peat extract | | |
| --- | --- | --- | --- |
| | aliphatic ester | resin | asphalt |
| Benzene/ethanol, or toluene/ethanol, or xylenes/ethanol | 49 | 33 | 18 |
| Ethanol | 56 | 32 | 12 |
| Benzene | 64 | 21 | 15 |
| Methylethyl ketone | 63 | 23 | 14 |
| Dichloroethane | 70 | 20 | 10 |
| n-Hexane | 90 | 9 | 1 |

*Resins are the bitumens soluble in ethanol at −10° C. Asphalts are the peat extracts insoluble in petroleum ether (40–60).
Aliphatic esters are the residue after the resin and asphalt have been removed.

Initially peat extract was obtained using a Soxhlet apparatus but this was subsequently replaced by a digestion procedure. The solvent used in both cases was a 9:1 vol./vol. blend of benzene and methylated spirits. The yields were 2.3% (Soxhlet procedure) and 1.9% (digestion procedure) respectively, or about 5% on a dry peat basis and are less than those quoted in the literature (4) and in the preliminary investigations (3) at the National Institute of Higher Education, Limerick in which case a yield of 9% on a dry peat basis was obtained. However, the digestion procedure gave a more rapid rate of production which was the prime consideration rather than to extract all the solvent soluble material.

Figure 1A:
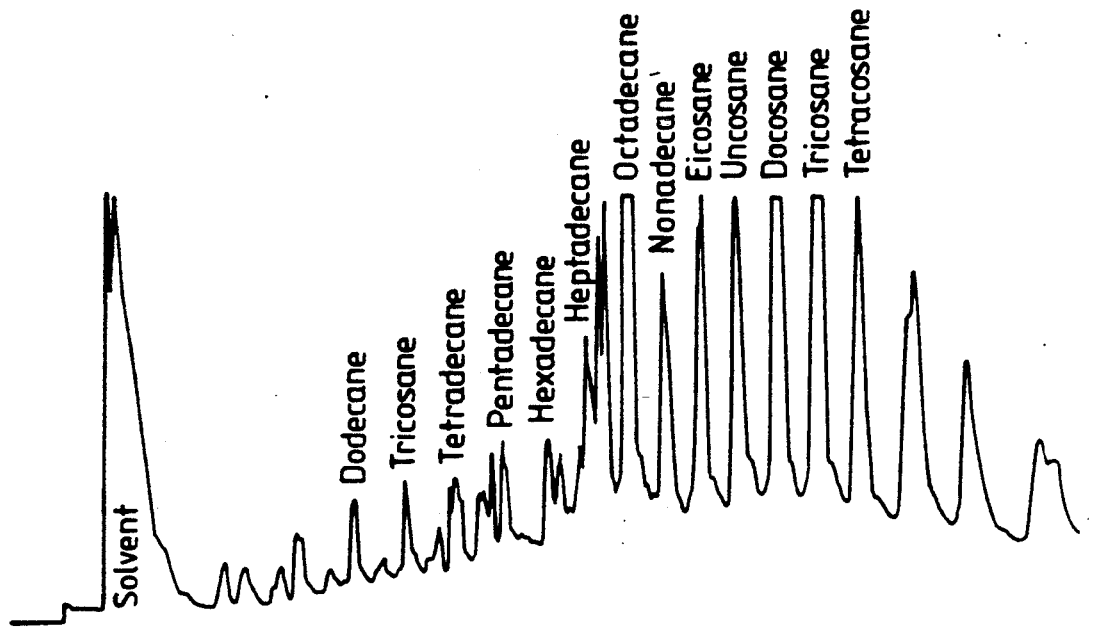
FIG. 1A is a gas chromatogram of peat bitumen extracted by the Soxhlet procedure.
Figure 1B:
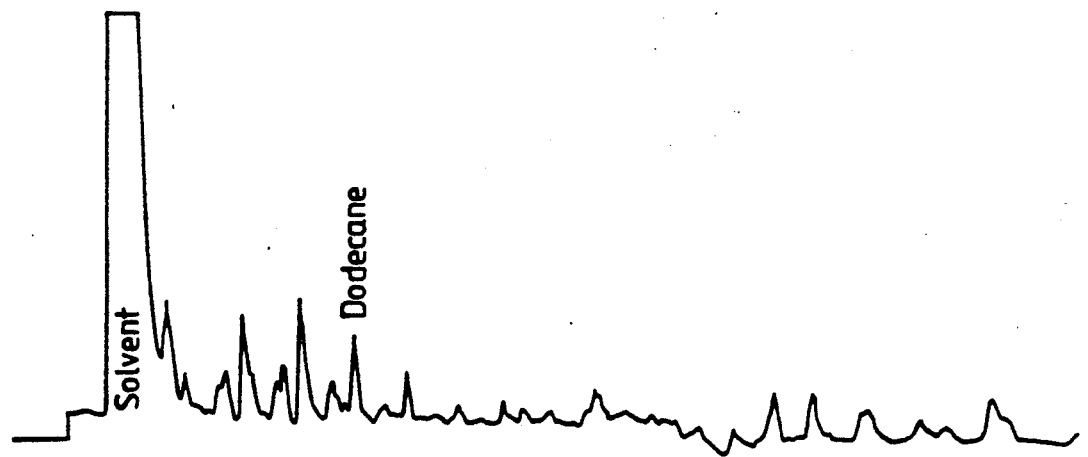
FIG. 1B is a gas chromatogram of peat bitumen extracted by the digestion procedure.

Differences in the chemical nature of peat extracts from the Soxhlet and digestion procedures were observed even though the same solvent was used in both processes. Firstly, the extracts differed in their solubility in carbon disulphide—the Soxhlet extract appeared to be completely soluble whereas only a portion of the digestion extract, was soluble. Carbon disulphide solutions (20% by volume) of the extracts or the soluble portion of the extracts, were examined by gas chromatography (GC); the chromatograms are shown in FIG. 1 of the accompanying drawings. Regularly spaced peaks typical of chromatograms given by the homologous series of n-alkanes can be seen in the Soxhlet extract chromatogram, several of the peaks had identical retention times to those given by n-alkane standards and are so marked. The chromatogram of the digestion extract was of a quite different appearance. The large initial peak(s) at the beginning of the chromatograms arise from carbon disulphide solvent and residual traces of benzene and ethanol which were used to obtain the peat extract.

Five blends, containing 10, 20, 30, 40 and 50% by weight of peat extract respectively in a nominal 200 penetration grade petroleum bitumen were prepared, by mixing the molten bitumens at 100° C. with an electrically driven stirrer. About 150g quantity of each blend was prepared and each appeared to be completely homogeneous as there was no evidence of oil separation.

All five blends and the separate petroleum and peat extracts were subjected to the standard empirical tests used to characterise road bitumens. The results of these tests together with the calculated penetration index and plasticity range values are given in Table 3. (N.B. The penetration index and plasticity range are measures of the temperature susceptibility of viscosity. Viscosity becomes less temperature susceptible as the index increases—conventional bitumens have indices between −1 and +1. The plasticity range is the temperature interval between the softening point and the Fraas brittle point).

TABLE 3

Empirical Rheological Characterisation of Blends of Peat Extract and Nominal 200 Penetration Petroleum Bitumen

| Property | % weight of peat extract in blend | | | | | |
|---|---|---|---|---|---|---|
| | 0 | 10 | 20 | 30 | 40 | 50 |
| Penetration at 25° C. (0.1 mm, 100 g, 5 s) | 184 | 204 | 315 | 100 | 40 | 32 |
| Penetration at 15° C. (0.1 mm, 100 g, 5 s) | 66 | 67 | 116 | 32 | 15 | 12 |
| Softening point (°C.) | 40 | 45 | 49 | 58 | 62 | 64 |
| Fraass brittle point (°C.) | −21.9 | −18.7 | −19.2 | −16.0 | — | — |
| Penetration index | −0.5 | +2.0 | +6.4 | +2.8 | +1.0 | +0.8 |
| Plasticity range | 61.9 | 63.7 | 68.2 | 74.0 | — | — |

Figure 2:
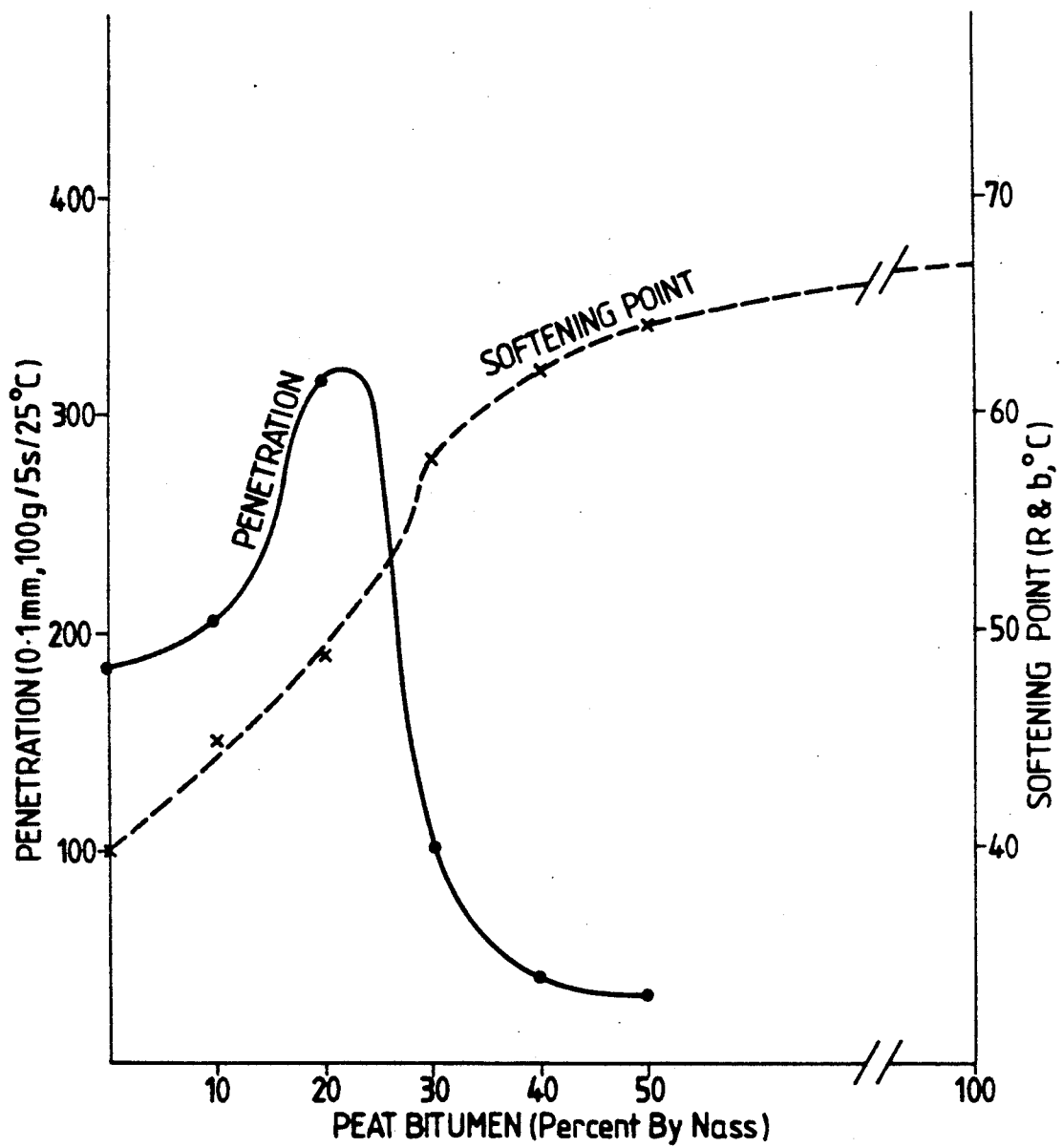
FIG. 2 shows the effect of peat bitumen content on the pen and softening point values of a 200 pen bitumen.

The addition of 10% and 20% of the peat extract at 25° C. caused an increase in the penetration value of the blend, but at peat extract concentrations of 30% and above this trend was reversed and the penetration value of the blend was much lower than that of the petroleum bitumen component. In contrast the softening point values increased with increasing peat extract content. These phenomena are also illustrated in FIG. 2 of the accompanying drawings. The plasticity range and also penetration index values calculated from the test data indicate that the addition of the peat extracts had had a marked effect on the rheological properties of the blends. In particular there has been a marked increase in the plasticity range. N.B. The softening point increase was greater than the increase in brittleness (Fraass brittle point). The effects are similar to those created by the addition of polymers to bitumen (19), FIG. 3 of the accompanying drawings.

These results indicate that the addition of peat extract has substantially reduced the temperature susceptibility of viscosity though this is not corroborated by the results of sliding plate microviscometer measurements over the temperature range 20°–45° C. (FIG. 4 of the accompanying drawings).

Viscosities were determined at the standard rate of shear of 0.05 seconds $^{-1}$. (In FIG. 4 viscosity-temperature relationships for typical penetration grade bitumens are illustrated for comparison). Values of A, the slope of the line of best fit assuming the linear relationship given in equation (1) are shown below. (N.B. Blends containing 40 and 50% peat extract had no flow properties over the ranges of temperature and shear rate used in these investigations.)

$$\log \text{viscosity} = A \log \text{temperature} + B \ldots \text{eqn.} \quad (1)$$

| Binder | A (Index of temperature susceptibility of viscosity) |
|---|---|
| 184 pen. petroleum bitumen | −5.65 |
| 184 pen. petroleum bitumen + 10% peat extract | −5.57 |
| 184 pen. petroleum bitumen + 20% peat extract | −5.62 |
| 184 pen. petroleum bitumen + 30% peat extract | −6.64 |

Effectively, the implication of the values of is that the effect of the peat extract content on the temperature susceptibility of viscosity of the binder is less than is indicated by the plasticity range and penetration index values in Table 3. This discrepancy is a phenomenon typically due to a change in the structure of the composite binder causing a change in the Newtonian properties (shear susceptibility). Rheograms (graphs of shear stress against rate of shear, FIG. 5 of the accompanying drawings) indicate that the gradient, i.e. the index of complex flow (c) in the relationship $\tau = \eta \gamma^c$ where $\tau$ is shear stress; $\eta$ is viscosity and $\gamma$ is rate of shear), is strongly influenced by the peat exatract content of the blend.

For Newtonian fluids (no gel structure) c=1 and the value c decreases as the non-Newtonian character (gel structure) increases. Indices of complex flow values for the various blends are:

| Binder | Index of Complex Flow value (c) |
|---|---|
| Nom. 200 pen. petroleum bitumen | 0.99 |
| Nom. 200 pen. petroleum bitumen + 10% peat extract | 0.90 |
| Nom. 200 pen. petroleum bitumen + 20% peat extract | 0.57 |
| Nom. 200 pen. petroleum bitumen + 30% peat extract | 0.21 |

It has been shown (10) that the value of c for bitumens can vary from 1.00 (no gel structure) to 0.54 (high gel structure). A relationship may exist between c and an ageing parameter from which it may be deduced that the value of c for road bitumens should not be less than 0.4 (11).

The high shear susceptibility of the blends may partly explain why the sliding plate viscometer does not give good agreement with viscosity measurements carried out using a Rotovisko viscometer, over the temperature range 43°–97.5° C., in which a relatively high rate of shear is employed. A comparison of changes in viscosity with temperature given by the two measuring techniques is shown in FIG. 6 of the accompanying drawings.

Petroleum bitumen is a multi-component hydrocarbon mixture with no sharp melting point in which the heaviest constituents, asphaltenes, having molecular masses(11),(12) of up to 30,000 a.m.u. have been postulated as being suspended in an oily disperse medium. The asphaltene nuclei are enveloped in a sheath of aromatic constituents or resins which because of their semipolar or polar nature oppose the coalescence or agglomeration of the nuclei or micelles.

The amount of peat extract which can be accommodated in a petroleum bitumen will depend upon its compatibility with the colloidal nature of the petroleum bitumen. Peat extract addition increases the asphaltene concentration in the binder (see Table 5). This is acceptable provided that the concentration does not become so great as to prevent the binder from exhibiting flow properties at ambient temperatures—as occurred in blends containing 40 and 50% peat extract. Furthermore, the more polar peat constituents could influence the peptisation and stability of the asphaltene micelles. The increased gel structure interpreted from the shear susceptibility measurements is consistent with these theories.

Differential scanning calorimetry can provide information on phase changes and changes in thermal energy arising from internal physical changes. A series of thermograms (the output from a differential scanning calorimeter) for the peat extract, petroleum bitumen and blends are shown in FIG. 8 of the accompanying drawings. The petroleum bitumen shows only a slight and poorly defined endothermic reaction, in the 40°–45° C. region whereas a number of reactions are evident in the peat extract sample. Unlike petroleum bitumen, peat extract melts over a narrow temperature range and it has been found (3) that this was 66°–69° C. for the benzene/ methylated spirits extract according to the drop point procedure (13). As the peat extract content of the blends increases from 10–30%, an endothermic peak at about 58° C. increases in intensity. At 40% peat extract content further peaks became evident at about 68° C. and 73° C. while at 50% peat extract content all the peaks have increased markedly in intensity. These phenomena may be evidence of changes in physical structure from the presence of peat extract or to a breakdown of the basic sol-colloidal structure of the petroleum bitumen component.

It should be noted that though the effect of the peat extract on the simple rheological test properties of the blends has been described as similar to that conferred by the addition of synthetic polymers, the blends did not display marked strain-recovery properties. Elastic recovery measurements were carried out using the modified sliding plate microviscometer method (14) in which the test temperatures were chosen so that the viscosity of the blends was about $5 \times 10^5$ Pa (Table 4).

TABLE 4

ELASTIC RECOVERY OF PEAT EXTRACT/PETROLEUM BITUMEN BLENDS

| Binder | Temperature of test (°C.) | Elastic Recovery (% of film thickness) |
| --- | --- | --- |
| 200 pen. petroleum bitumen | 18 | 15* |
| 200 pen. petroleum bitumen + 10% peat extract | 12.8 | 12 |
| 200 pen. petroleum bitumen + | 16.5 | 40 |

TABLE 4-continued

ELASTIC RECOVERY OF PEAT EXTRACT/PETROLEUM BITUMEN BLENDS

| Binder | Temperature of test (°C.) | Elastic Recovery (% of film thickness) |
| --- | --- | --- |
| 20% peat extract 200 pen. petroleum bitumen + 30% peat extract | 20.7 | 29 |

*The elastic recovery of unmodified bitumens usually lies between 0 and 25

The changes in the rheological and physical nature of the petroleum bitumen caused by the peat extract addition were associated with changes in the asphaltene concentrations in which the n-heptane insoluble content (asphaltenes) of the blends was determined. The procedure described in the Institute of Petroleum method 143/78 was followed and the results are presented in Table 5.

TABLE 5 n-HEPTANE INSOLUBLES (ASPHALTENES CONTENT OF PEAT EXTRACT/PETROLEUM BITUMEN BLENDS

| Binder | n-Heptane insolubles (%) (a) expt. | (b) calculated |
| --- | --- | --- |
| Nom. 200 pen. petroleum bitumen | 11 | |
| 200 pen. petroleum bitumen + 10% peat extract | 14 | (13) |
| 200 pen. petroleum bitumen + 20% peat extract | 13 | (16) |
| 200 pen. petroleum bitumen + 30% peat extract | 18 | (19) |
| 200 pen. petroleum bitumen + 40% peat extract | 22 | (22) |
| 200 pen. petroleum bitumen + 50% peat extract | 23 | (24) |
| Peat extract | 38 | |

Peat extract has a high n-heptane insoluble content compared with petroleum bitumen and values for the blends were close to those, in parenthesis, which were calculated from the insoluble content of the two components. Hence the n-heptane insoluble content is a possible indicator of the peat extract content of commercial blends.

There is a maximum peat extract content above which it is likely blends would become "cheesy" and so lack adequate cohesion and adhesion properties, though maximum peat contents may vary according to the chemical nature of the peat extract.

Laboratory experiments indicate that the weathering properties of the blends may reflect the presence of the peat extract. There is a gradual, almost linear increase in viscosity of peat extract and petroleum bitumen when they are held at 100° C. for over three hours. Whereas the viscosity of petroleum bitumen increased by 6%, the viscosity of a butanol peat extract increased by 77% while a 7:3 blend, respectively, of these bitumens increased in viscosity by 22%. Different types of peat extract increase in viscosity by different amounts after storage in small containers in the laboratory for two months (Table 6), whereas petroleum bitumens showed no appreciable viscosity increase over this period.

TABLE 6

| Peat extract obtained with | Viscosity* increase after two months storage at ambient temperature (%) |
| --- | --- |
| Benzene/ethanol | 46 |
| Butan-2-ol | 322 |
| n-Hexane | 150 |

TABLE 6-continued

| Peat extract obtained with | Viscosity* increase after two months storage at ambient temperature (%) |
|---|---|
| Petroleum ether (60-80) | 25 |

*measured at 90° C. on a Rotovisco voscometer.

Thus peat extracts, are more susceptible to age hardening than petroleum bitumens. The hardening is unlikely to be due to evaporation of lighter constituents. Thermogravimetric analysis emphasises that volatilisation is unlikely to occur to any significant extent at temperatures below 250° C., though above this temperature there is a smooth gradual loss of weight up to about 500° C. for all bitumens (Table 7 and FIG. 7 of the accompanying drawings). The hardening most probably arises from chemical reactions e.g. polymerisation, condensation, oxidation etc.

TABLE 7

| Peat extract obtained with | mean % weight loss up to 250° C. | mean % weight loss between 250° C. and 500° C. |
|---|---|---|
| Benzene/ethanol, or toluene/ethanol, or xylenes/ethanol | 6 | 58 |
| n-Butanol | 12 | 73 |
| n-Hexane | 5 | 86 |
| Petroleum ether (60-80) | 9 | 65 |
| White spirits | 8 | 65 |
| Kerosenes (paraffins) | 7 | 70 |
| *cf 100 pen. petroleum | 0 | 75 |
| 200 pen. petroleum | ½ | 75 |

The percent weight loss below 250° C. may be partially due to any residual extraction solvent in the peat extract.

In any commercial operation it may be necessary to hold the blends of peat and petroleum binder products at high temperatures for long periods (in terms of days) without adversely affecting the product. To examine their storage stability, blends were tested according to the procedure developed by Tingle et al (20). The relative density at 20° C. of the peat extract was 1.0516 (according to STPTC test method RT1-79 (15)) which was only slightly above that of the petroleum bitumen, 1.0246. Slight foaming occurred in preparing the blends containing the highest peat extract content. (This is probably due to evolution of residual solvent in the peat extract). However, no foaming was experienced in the case of blends containing 20 and 30% peat extract. Results of the storage stability tests are shown in Table 8.

TABLE 8

HOT STORAGE TESTS ON PETROLEUM BITUMEN, PEAT EXTRACTS AND ON THEIR BLENDS

| Sample | Initial density (g/cc) | Density of bottom third of tube after 4 days at 160° C. |
|---|---|---|
| 200 pen. petroleum bitumen + 10% peat extract | 1.0256 | — |
| 200 pen. petroleum bitumen + 20% peat extract | 1.0275 | 1.0275 |
| 200 pen. petroleum bitumen + 30% peat extract | 1.0264 | 1.0284 |
| Peat extract | 1.0516 | |

These results do not indicate that any significant separation of the components occurred or that any sedimentation of the slightly heavier peat components had taken place during the test.

Modified bitumen road binders seldom comply with specifications for penetration grade bitumens. Apart from the effect of peat extract on the penetration value (Table 9) the peat extract/petroleum bitumen blends are unlikely to comply with specification requirements for conventional road bitumens. For example the blends and the petroleum bitumen fail to satisfy the requirement that the binder should be 99.5% soluble in trichloroethylene, as shown in Table 9.

TABLE 9

SOLUBILITY OF PEAT EXTRACT/PETROLEUM BITUMEN BLENDS IN TRICHLOROETHYLENE

| Binder | Solubility in trichloroethylene (per cent by weight) | |
|---|---|---|
| 200 pen. petroleum bitumen | 99.3 | (DOE specificiation requirement is 99.5% minimum) |
| 200 pen. petroleum bitumen + 10% peat extract | 99.2 | |
| +20% peat extract | 98.6 | |
| +30% peat extract | 99.1 | |

The consistency of the blends may be most conveniently determined by viscosity measurements at say 60° C. and 135° C., further tests will be necessary to determine the peat extract content and the stability on hot storage.

Numerous reviews have been published and conference papers presented on dewatering peat; the methods include compression, heat, using different solvents and combinations of solvents (many at high temperatures of about 190° C.). The impetus for this research arises because the more traditional climatic methods proceed at too slow a rate to a relatively high (about 50%) residual water content. Leaving aside compression, which will only dewater to at best about 65% water and so should be used as a preliminary step for other more energy intensive systems, solvent dewatering will be considered first followed by peat dewatering processes.

There are two fundamentally different approaches to solvent dewatering of peat which arise from the physical properties of solvents. Organic solvents can be categorised as those which are completely miscible or immiscible with water at all temperatures and those whose solubility in water increases with a rise in temperature. Honea et al (16) have evaluated the performance of acetone, methanol, ethanol and an acetone-water (12%) azeotrope, that is solvents which are completely miscible with water at all temperatures, in drying peat containing 89% water. They conclude that acetone can be used with a low contact time (about 2 mins) and low solvent to peat ratios (1:1) in order to reduce the water content of the peat to about 20 to 30%; methanol and ethanol were less promising. As the extraction can be undertaken at ambient temperature the only heat input is in distillation to recover solvent and peat bitumen from the water. Unfortunately solvent losses on the peat can be high so the overall cost and energy benefit of the process compared with the traditional climatic drying to about 50% water is tenuous.

Generally peat dewatering processes, devised to use solvents which dissolve water more readily at higher temperatures, mix the wet peat with the organic solvent to form a pumpable slurry and then heat the mixture. The temperature and pressure in the reactor will depend on the particular solvent; the pressure must be high enough to prevent evaporation of water as this consumes a great deal of energy. At elevated temperatues most of the water from the peat dissolves in the solvent. This solvent when separated from the peat (gravity and pressing etc.) and cooled, separates into water-rich and solvent-rich layers. Peat bitumen is recoverable by distillation of the solvent-rich layer (the solvent water azeotrope is recycled) and centrifuging the residue of water/peat extract when bulked with the solvent-stripped, water-rich layer (which would contain some peat extract). The process advantage is that water vaporisation is avoided, thus saving much energy though sensible heat in the solvents and dewatered peat must be recovered in heat exchangers to heat the incoming raw peat slurry. According to Paganessi et al (17) who have evaluated this method recently for several solvents, it is important for the peat and solvent to separate quickly after mixing and for the solvent to have a wide differential of water solubility across the temperature range used. Benzene reduces the peat water content to about 30%, most of this in the pressing step, whereas diethyl ketone carries the bulk of water away in the phase separation fraction, leaving overall about a 50% peat water content. However, almost ten times the volume of benzene is needed to remove each pound of water compared with diethyl ketone. Dewatering costs are very sensitive to solvent recovery, the higher the recovery the cheaper the process as less make-up solvent is needed. The ability of peat to absorb up to ten times its weight of water and organic solvents has been reported by Fuchsman (4). In conclusion, Paganessi et al feel that currently this method is not economically competitive.

In a series of experiments, a column of peat was washed with a homogeneous benzene/ethanol (2:1) solvent mixture at various temperatures and fractions of the elutant collected. Two facts became evident: (i) the rate of extraction of peat extract and water from the peat was exponential and (ii) the water was removed emulsified in the solvent. Approximately five times the peat volume of solvent was required to extract the peat extracts at each temperature. The emulsified water content of the solvent gradually decreased until collected fractions no longer separated into two layers on standing, then in succeeding fractions the cloudy solution became clear. This latter fact was taken to indicate that the maximum amount of water had been removed from the peat by the system. Residual water in the dewatered peat was determined at 7% (via a Dean & Stark azeotrope distillation method with allowance for ethanol contamination, because the standard drying by heat method was complicated since the peat held solvent as well as water) as compared with 66% moisture in the original peat. The total benzene/ethanol extractable peat extracts in the peat were determined in a Soxhlet apparatus at 7.73% on the dry peat. This figure can vary between 5 and 15% for different peats (4). Table 10 summarises data from this series of experiments.

TABLE 10

| Extraction temperature (°C.) | Volume of solvent to dewater the peat sample (ml) | Recovery of peat extracts as a % of the total present in the peat (i.e. 7.73% on dry peat) eluted with the vol. of solvent needed to remove the max. amount of water. |
|---|---|---|
| Ambient (about 20° C.) | 75 | 75 |
| 40 | 90 | 90 |
| 60 | 130 | 96 |

From these experiments, it is evident that peat can be dewatered with benzene/ethanol solvent as effectively at ambient as at elevated temperatures, though the amount of peat extract extracted will be lower. Such a system would require less heat input than the previous method of Paganessi et al (17), but the commercial viability will still depend on the extent of solvent recovery from the dewatered peat.

Several systems can be used to dry peat and similar water laden biomass waste products in the food, paper, spirits and sewage industries. A comparison of peat dewatering costs of four such systems to 35% peat mixture content have recently been reviewed by C.L. Tsaros (23) and these can be summarised as:

(i) pressing followed by rotary drum drying—59.1% efficient (ii) pressing followed by flash drying—66.8% efficient (iii) pressing followed by fluidised-bed drying—62.9% efficient (iv) pressing followed by a recycling multi-effect drying system—90.6% efficient In dewatering peat from 92 to 70% moisture by pressing, over 4½ times more water can be removed than by drying from 70 to 35% moisture. The cost per unit of water removed by pressing is a fraction of that for drying, in this case, somewhat less than 40% of the total cost or a tenth the cost per unit of water. This highlights the need for mechanical dewatering to as low a level as possible before thermal drying. In fact, the largest single item of cost for cases (i) to (iii) is drier fuel (i.e. peat). Case (iv) reduces fuel consumption substantially in comparison by using multiple effect evaporation (recycling heat) and a recyclable peat fluidising oil. So to produce the same quantity of dry peat case (iv) needs only two thirds the quantity of feed peat needed by any of the other cases, and in addition has the capability of drying peat with ease to 4% moisture content.

The multi-effect process in case (iv) is being developed by its originator in America so that a light fluidising oil can be used. This will enable peat extracts to be extracted while dewatering the peat and allow them to be sold as a by-product so offsetting some of the running costs of the plant.

Similar results may be obtained using the pyrolytic products of peat or montan wax Seventy full scale multi-effect plants have been built in the U.S.A. and Europe. Those using a heavy fluidising oil process from 0.4 to 30 tons of dry solids per day while the newer plants using a light fluidising oil process from 7 to 265 tons dry solids per day. Typical applications are:

(1) for heavy fluidising oil
  (a) to produce animal feed from: slaughterhouse waste and rendering plants (for viscera, bones, hooves, horns, excess fat, skin, offle from cattle, pigs, fish and poultry) food wastes (dog food waste, cheese whey) brewery wastes.
  (b) to produce fuel or fertilizer from: sewage sludge, pulp and paper industry sludge (2) for light fluidising oil recovery of corn oil from spent grain used in the brewing industries.

Experience from these dewatering plants allows calculation of the probable percentage increase in calorific output for peat from a dewatering plant which would use peat as a source of energy to evaporate the moisture; this is compared with that from burning "wet" peat in FIG. 9.

It is being emphasised that an essential feature of the application of peat extracts in road binders is that the residual peat (i.e. peat following extraction and dewatering) is utilised as a fuel. The calorific values of the undried milled peat, oven-dried milled peat, and the residue from a benzene/ethanol solvent extraction were approximately:

Undried peat (about 55% water content): 9 MJ/kg
Oven-dried peat: 20.2 MJ/kg
Residual peat: 21.5 MJ/kg This suggests that (having regard to experimental error) the residual peat when oven-dried has about the same calorific value as the oven-dried unextracted peat. Thus, in addition to the use of peat extracts as a partial relacement for imported petroleum bitumen, the dry calorific value per unit mass of the peat has not been significantly diminished by the removal of the peat extracts. As partial dewatering of the peat also occurs it can be said that the solvent extraction process has effectively enhanced its fuel value. The optimum working range for an increase in calorific output would be by drying peat from between 75% and 35% moisture to gain respectively 40% or 4.5% extra peat output. Little or nothing would be gained by drying peat from an initial moisture level of 35% or less while moisture content in excess of 75% are best reduced by pressing. On this basis, savings in fuel costs could be estimated for, e.g. the Irish Electricity Supply Board's peat fired power stations.

1M tonnes of peat at 70% moisture dried to 35% moisture by this process would yield an equivalent energy output with a saving 0.24M tonnes of peat or IR 7.2M (at IR £ 30/tonne) compared with burning 1M tonnes of 70% moisture peat, plus receipts from the sale of 11,660 tonnes of peat bitumen which would be worth IR £ 2.33M (at IR £ 200/tonne), a total saving of IR£ 9.53M.

Similarly for 1M tonnes of peat (at 55% moisture) the savings would be 0.067M tonnes peat, IR £ 2.33M (at £ 35/tonne) plus IR £ 2.67M from peat bitumen a total of £ 5.0M. Loss of fluidising oil in each case would be respectively 2,750 tonnes and 1,950 tonnes or IR £ 1.65M and IR £ 1.17M at IR 600/tonne.

Furthermore peat with its low sulphur content, 0.8% on the dry peat, would produce cleaner more environmentally acceptable exhaust gas without gas scrubbers, than coal or oil fired power stations.

The benefits of this development are as follows:

(a) The partial replacement of a product derived from petroleum which is becoming less abundant and more costly.

(b) The blends behave as a composite material with enhanced rheological properties and not merely as a physical mixture of the two components. The change in the physical nature of the petroleum bitumen results in an increase in plasticity range (typically from 62° C. to 74° C. in blends containing 30 per cent peat extract).

(c) Because of the chemical properties of peat extracts their incorporation in petroleum bitumen facilitates the manufacture of bitumen emulsions which are widely used in the road construction industry.

These blends may be handled and used as conventional bituminous binders i.e. mixed with road aggregate and laid as "carpets" or sprayed on the surface as surface seals.

Fluidity for handling and application may be achieved by:

(a) heating;

(b) adding solvents to produce a "cutback" binder, so lowering the viscosity and thus the required application temperature; and (c) emulsification—in which case ambient temperatures or temperatures slightly above ambient are adequate.

The composition according to the invention may be used in road construction as a road binder or as a protective component of roofing material such as roofing felt or the like. In addition, the composition according to the invention may be used as a component of bitumastic paint. Mastic/asphalt flooring may comprise the composition according to the invention.

REFERENCES

1. ORGANISATION FOR ECONOMIC CO-OPERATION AND DEVELOPMENT, "Road binders and energy savings" (in preparation), OECD, 2 Rue Andre Pascal, 75775 Paris, Cedex 16, France.
2. JAMIESON, I.L., "Pavement binders and energy saving", An Foras Forbartha report RC 268, Dublin 1984.
3. McCAFFREY, G., "The extraction and analysis of Irish peat waxes", N.I.H.E., Limerick, final year degree project report 1983.
4. FUCHSMAN, C.H., "Peat, Industrial Chemistry and Technology", Academic Press, New York, London, 1980.
5. BEL'KEVICH, P.I., et al., "Peat Wax and Associated Products", Nauka I. Tekhnika, Minsk, 1977 (in Russian).
6. ACKROYD, G.C., "The extraction, properties and constitution of peat wax", International Peat Symposium, Dublin, July 1954.
7. REILLY, J. et al., "Mixtures of constant boiling point for solvent extraction purposes", Journal of the Society of Chemists, London, July 1937.
8. PRANKRATOV, N.S., et al., "Granulated peat as a technological raw material for the production of wax", Khimiya Tverdogo Topliva, 1975, 9(6), 31–33.
9. MAJIZADEH, K. & SCHWEYER, H.E., "Non-Newtonial behaviour of asphalt cements", Proceedings of the Association of Asphalt Paving Technologists, 1965, 34, 20.
10. JAMIESON, I.L., & HATTINGH, M.M., "The correlation of chemical and physical properties of bitumens with their road performance", Proceedings of the 5th Conference of the Australian Road Research Board, Canberra, 1970, 5(5), 193.
11. SNYDER, L.R., "Determination of asphalt molecularweight distributions", Analytical Chemistry, 1969, 41, 1123–1227.
12. BODUSZYNSKT, M.M., McKAY, J.F., & LATHAM, D.R., "Asphaltenes, where are you?, Proceedings of the Association of Asphalt Paving Technologists, 1980, 49, 123.
13. BRITISH STANDARD 894: 1956, "Ubbelohde apparatus for flow and drop points".
14. SZATOWSKI, W., "Determination of the elastic recovery of binder/polymer mixtures using a modified slidingplate microviscometer", Road Research Laboratory Internal Report, LR14, 1967, Crowthorne, Berks.
15. STANDARDISATION OF TAR PRODUCTS TESTS COMMITTEE, "Standard methods for testing tar and its products", British Carbonisation Research Association, Chesterfield, 1979, 7th Edition.
16. HONEA, F.I., STENBERG, V.I., HASAN, R., "Solvent extraction dewatering of peat", Institute of Gas Technology Symposium on Peat as an Energy Alternative II, Arlington, Vancouver, U.S.A., 1-3 December 1981.
17. PAGANESSI, J. E., MENSINGER, M.C., TSAROS, C.L., ARORA, J., "Peat dewatering solvent extraction", U.S. Dept. of Energy 3rd Technical Contractors' Conference on Peat, Bethesda, Maryland, U.S.A. 29-30 April 1981.
18. TSAROS, C.L., "Comparison of dewatering costs", Institute of Gas Technology, Smyposium on Peat as an Energy Alternative II, Arlington Vancouver, 1-3 December 1981.
19. MARVILLET J; VERSCHAVE A; DUVAL A; "Bitumen-polymer binders for surface dressing" Eurobitume Seminar, London, 14-15 November 1978.
20. TINGLE, E.D., WRIGHT, N., & STEWART. M., "The use of a density gradient volume in a storage stability test for pitch/bitumen mixtures", Road Research Laboratory Internal Report No. RN/4112/EDT. NW. MS., Harmondsworth, DSIR, 1962, (TRRL Crowthorne, Berks., England).
21. CHRISTIAN, ROY; CHORNET, ESTEBAN; and FUCHSMAN C.H.; "The Pyrolysis of Peat", Journal of Analytical and Applied Pyrolysis, 5 (1983) 261-332.

We claim:

1. A composition which consists of at least one of a solvent extract of peat and a pyrolysis product of peat and paving grade petroleum bitumen wherein said solvent extract of peat or pyrolysis product of peat is present in an amount ranging from an amount sufficient to increase the softening point of said petroleum bitumen to 50 percent by weight and the remainder of said composition being said petroleum bitumen.

2. A composition according to claim 1 wherein said solvent extract of peat or pyrolysis product of peat is present in an amount ranging from 10 to 50% by weight.

3. A composition according to claim 1 wherein the penetration value of the petroleum bitumen is in the range 35 pen. to 450 pen.

4. A composition according to claim 3 having a penetration value in the range 35 pen. to 450 pen.

5. A composition according to claim 4 having a penetration value in the range 50 pen. to 200 pen.

6. A composition according to claim 1 which comprises a solvent extract of peat and petroleum bitumen of the paving grade type wherein the solvent extract of peat is characterised by the following properties viz:
   Saponification value: 71-231 mgKOH/g
   Acid value: 15-105 mgKOH/g
   Ester value: 32-139 mgKOH/g
   Iodine value: 14-46 cg/g
   Melting point (drop point): 67°-86° C.

7. A composition according to claim 6 in which the solvent used to obtain the solvent extract of peat is selected from petrolium distillates; chlorinated petroleum distillates; $C_1$-$C_{18}$ alcohols; $C_1$-$C_{18}$ chlorinated alcohols; $C_3$-$C_{18}$ ketones; $C_3$-$C_{18}$ chlorinated ketones; $C_6$-$C_{10}$ aromatic solvents; $C_6$-$C_{10}$ chlorinated aromatic solvents; or derivative thereof.

8. A composition according to claim 9 wherein the solvent used to obtain the solvent extract of peat is selected from benzene/ethanol; toluene/ethanol; xylenes/ethanol; butan-2-ol; n-butanol; n-hexane; petroleum ether (40-100); 100pen. petroleum; 200pen. petroleum; white spirits; dichloroethane; methylethylketone; methylated spirits; trichloroethylene; chlorinated hydrocarbons; or kerosenes(paraffins).

9. A composition according to claim 8 wherein the solvent used to obtain the solvent extract of peat is white spirits.

10. A composition which consists of about 15 to about 30 percent by weight of a solvent extract of peat or a pyrolysis product of peat and the remainder being paving grade petroleum bitumen.

* * * * *